United States Patent
Adibhatla et al.

(10) Patent No.: US 10,196,928 B2
(45) Date of Patent: Feb. 5, 2019

(54) METHOD AND SYSTEM FOR PIPING FAILURE DETECTION IN A GAS TURBINE BLEEDING AIR SYSTEM

(71) Applicant: General Electric Company, Schenectady, NY (US)

(72) Inventors: Sridhar Adibhatla, Glendale, OH (US); Steven Edward Nolte, West Chester, OH (US); Jeffrey Wayne Litzler, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 15/059,116

(22) Filed: Mar. 2, 2016

(65) Prior Publication Data

US 2017/0254216 A1 Sep. 7, 2017

(51) Int. Cl.
| | | |
|---|---|---|
| *F02C 7/18* | (2006.01) | |
| *F01D 21/00* | (2006.01) | |
| *F01D 21/14* | (2006.01) | |
| *F02C 6/08* | (2006.01) | |
| *F02C 9/18* | (2006.01) | |

(52) U.S. Cl.
CPC .......... *F01D 21/003* (2013.01); *F01D 21/14* (2013.01); *F02C 6/08* (2013.01); *F02C 9/18* (2013.01); *F05D 2260/80* (2013.01); *F05D 2270/09* (2013.01)

(58) Field of Classification Search
CPC ...... F02C 6/08; F02C 7/18; F02C 9/18; F02C 9/50; F02C 9/52; F01D 21/003; F01D 21/14

USPC .............. 73/861.18, 40, 592; 702/51; 374/4
See application file for complete search history.

(56) References Cited

U.S. PATENT DOCUMENTS

| | | | |
|---|---|---|---|
| 3,788,141 A | 1/1974 | Blackwell | |
| 4,353,118 A | 10/1982 | Heimgartner et al. | |
| 4,543,817 A | 10/1985 | Sugiyama | |
| 4,756,152 A | 7/1988 | Krukoski et al. | |

(Continued)

FOREIGN PATENT DOCUMENTS

| | | | |
|---|---|---|---|
| CN | 1507534 A | 6/2004 | |
| CN | 1558099 A | 12/2004 | |

(Continued)

OTHER PUBLICATIONS

Extended European Search Report and Opinion issued in connection with corresponding EP Application No. 16204869.8 dated Jun. 28, 2017.

(Continued)

*Primary Examiner* — William H Rodriguez
(74) *Attorney, Agent, or Firm* — General Electric Company; William Andes

(57) ABSTRACT

A pipe fault detection system is provided for a gas turbine engine having a compressor and a turbine. The pipe fault detection system includes a cooling manifold configured to direct cooling air from the compressor to the turbine. The cooling manifold includes at least two cooling pipes, a sensor configured to detect an operating condition indicative of a pipe break, and a controller configured to control the amount of cooling air through the cooling manifold in response to the operating condition detected by the sensor.

7 Claims, 3 Drawing Sheets

(56) References Cited

U.S. PATENT DOCUMENTS

| | | | | |
|---|---|---|---|---|
| 5,081,864 A * | 1/1992 | Zaim | ................... | G01M 3/226 340/605 |
| 5,117,676 A | 6/1992 | Chang | | |
| 6,389,881 B1 * | 5/2002 | Yang | ................... | G01M 3/243 73/40.5 A |
| 6,401,525 B1 * | 6/2002 | Jamieson | ................ | G01M 3/005 73/1.25 |
| 6,922,641 B2 | 7/2005 | Batzinger et al. | | |
| 9,885,284 B2 * | 2/2018 | Pelagatti | .................. | F02C 6/08 |
| 2005/0006529 A1 * | 1/2005 | Moe | ..................... | B64D 15/12 244/134 D |
| 2006/0174628 A1 * | 8/2006 | Mikhail | ................ | B64D 13/00 60/772 |
| 2008/0141644 A1 * | 6/2008 | Schlichting | ............. | F02C 6/08 60/39.11 |
| 2010/0158068 A1 | 6/2010 | Monteiro | | |
| 2010/0215480 A1 * | 8/2010 | Leach | .................... | F02C 9/18 415/145 |
| 2010/0251727 A1 * | 10/2010 | Myers | ..................... | F01K 13/02 60/773 |
| 2011/0192170 A1 * | 8/2011 | Dooley | ................ | B64D 13/02 60/785 |
| 2012/0060507 A1 * | 3/2012 | King | ...................... | F01D 5/081 60/782 |
| 2013/0187007 A1 * | 7/2013 | Mackin | ................... | F02C 6/08 244/134 R |
| 2013/0192251 A1 | 8/2013 | Munsell et al. | | |
| 2014/0000279 A1 * | 1/2014 | Brousseau | ............ | B64D 13/08 60/782 |
| 2014/0250898 A1 * | 9/2014 | Mackin | ................... | F02C 6/08 60/772 |
| 2014/0309846 A1 | 10/2014 | Howard | | |
| 2014/0311157 A1 * | 10/2014 | Laurello | .................. | F02C 7/18 60/782 |
| 2015/0000297 A1 * | 1/2015 | Arias Chao | ............... | F02C 7/12 60/772 |
| 2015/0027129 A1 * | 1/2015 | Franitza | .................. | F02C 7/18 60/782 |
| 2015/0089955 A1 * | 4/2015 | Knapp | ..................... | F02C 6/08 60/782 |
| 2015/0159557 A1 * | 6/2015 | Scipio | ....................... | F02C 7/30 60/775 |
| 2015/0292357 A1 * | 10/2015 | Todorovic | ............... | F01D 25/14 415/177 |
| 2016/0326878 A1 * | 11/2016 | Morimoto | .............. | F01D 5/081 |
| 2017/0096945 A1 * | 4/2017 | Mueller | ................... | F01D 5/02 |
| 2017/0169632 A1 * | 6/2017 | Green | ................. | G07C 5/0825 |
| 2017/0234135 A1 * | 8/2017 | Takamura | ................. | F01D 5/08 415/116 |
| 2017/0298836 A1 * | 10/2017 | Tiwari | ..................... | F02C 9/18 |

FOREIGN PATENT DOCUMENTS

| | | |
|---|---|---|
| CN | 101852135 A | 10/2010 |
| CN | 203879634 U | 10/2014 |
| GB | 2522925 A | 8/2015 |
| WO | 2015/124889 A1 | 8/2015 |

OTHER PUBLICATIONS

Machine Translation and First Office Action and Search issued in connection with corresponding CN Application No. 201710001134.9 dated Jun. 20, 2018.

* cited by examiner

METHOD AND SYSTEM FOR PIPING FAILURE DETECTION IN A GAS TURBINE BLEEDING AIR SYSTEM

STATEMENT REGARDING FEDERALLY SPONSORED RESEARCH & DEVELOPMENT

This invention was made with Government support under contract number DTWAFA-10-C-00046 awarded by the Federal Aviation Administration (FAA). The U.S. Government may have certain rights in this invention.

BACKGROUND

The field of the disclosure relates generally to gas turbine engines and, more particularly, to gas turbine engines equipped with an engine cooling system.

Many known gas turbine engines are equipped with a compartment cooling system that extracts cooling air from the compressor section of the engine and directs the cooling air into the turbine section of the engine to reduce high temperatures produced by operation of the engine combustor and turbines downstream of the compressor section. The cooling system typically includes a cooling manifold that is divided into a plurality of pipes. In the event that a pipe fails by cracking or otherwise breaking, and thereby fails to deliver cooling air sufficiently therethrough, cooling air is nevertheless provided by the remaining pipes. The manifold pipes bleed airflow from the compressor to cool the turbine. However, the bleed of excess airflow through each pipe, to accommodate a broken pipe, decreases the aerodynamic fuel efficiency of the gas turbine engine in-flight. Energy produced by the compressor is used for cooling instead of for producing engine thrust.

At least some known piping failure detection systems have attempted to place sensors along the cooling manifold pipes to detect breaks. However, the thermodynamically robust environment of the gas turbine engine has made these conventional sensors fail more often than the pipes in which they are placed to monitor. This disparate failure rate between the sensors and the pipes themselves creates false positive readings of pipe failure, or an inability to detect pipe failure entirely.

BRIEF DESCRIPTION

In one aspect, a pipe fault detection system is provided for gas turbine engines including a compressor and a turbine. The pipe fault detection system includes a cooling manifold configured to direct cooling air from the compressor to the turbine. The cooling manifold includes at least two cooling pipes, a sensor configured to detect an operating condition indicative of a pipe break, and a controller configured to control the amount of cooling air through the cooling manifold in response to the operating condition detected by the sensor.

In another aspect, a method of detecting a pipe fault in a gas turbine engine is provided. The method includes generating power within the gas turbine engine, measuring sensor data from at least two sensors disposed at different locations within the gas turbine engine, comparing the measured sensor data from the at least two sensors with stored data in a lookup table, and transmitting an alert signal based on the comparison.

In yet another aspect, a gas turbine engine includes a compressor, a turbine, a cooling manifold, a sensor, and a controller. The cooling manifold is configured to direct cooling air from the compressor to the turbine, and includes at least two cooling pipes. The sensor is configured to detect a difference between a first operational parameter at a first location and a second operational parameter at a second location different from the first location. The controller is configured to control the amount of cooling air through the cooling manifold in response to the difference detected by the sensor.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly indicates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to detecting and compensating for pipe breaks in a gas turbine engine.

The following description refers to the accompanying drawings, in which, in the absence of a contrary representation, the same numbers in different drawings represent similar elements.

Figure 1:
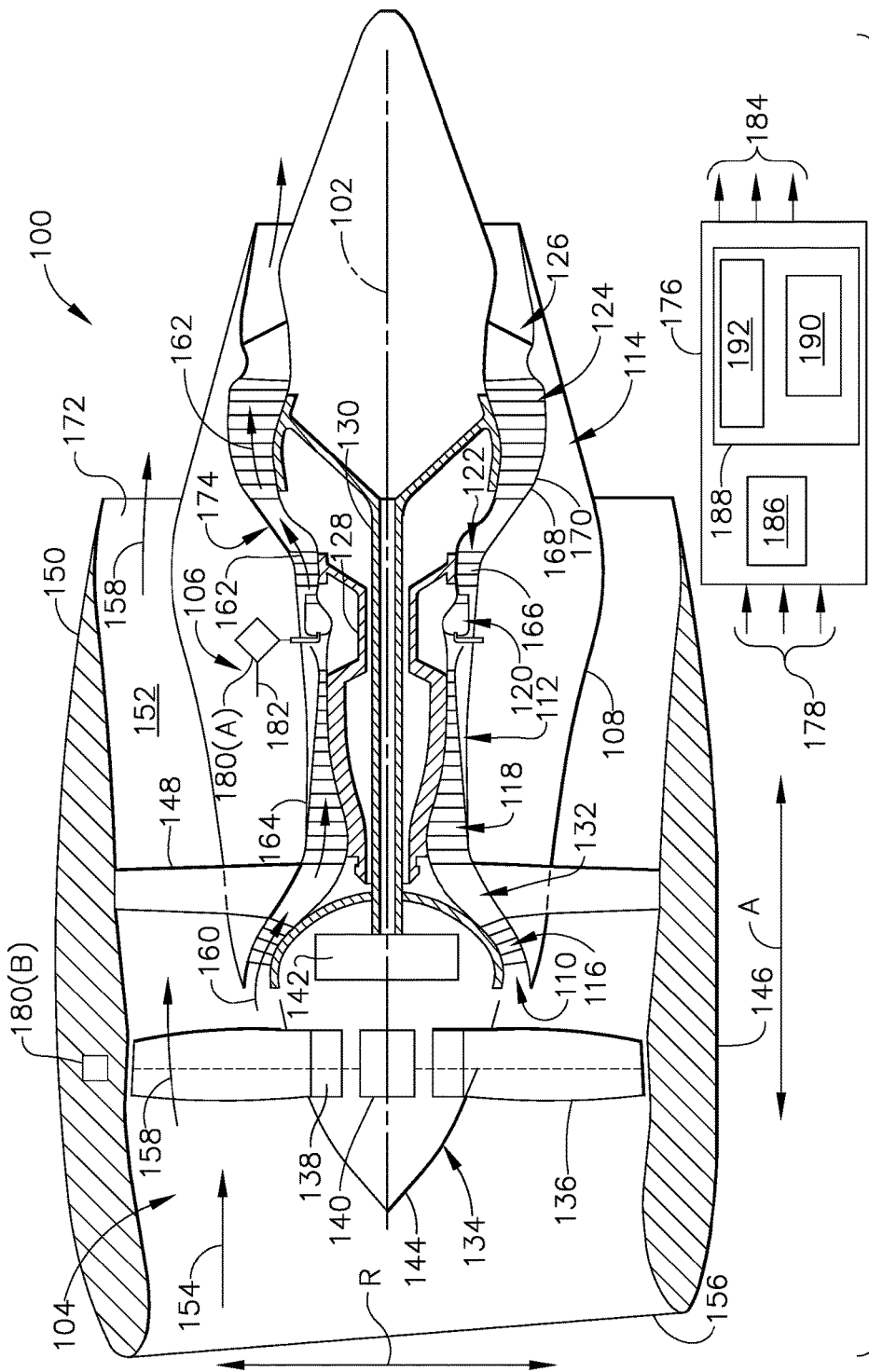
FIG. 1 is a schematic illustration of an exemplary gas turbine engine in accordance with an exemplary embodiment of the present disclosure.

FIG. 1 is a schematic cross-sectional view of a gas turbine engine 100 in accordance with an exemplary embodiment of the present disclosure. In the exemplary embodiment, gas turbine engine 100 is embodied in a high-bypass turbofan jet engine. As shown in FIG. 1, gas turbine engine 100 defines an axial direction A (extending parallel to a longitudinal axis 102 provided for reference) and a radial direction R. In general, gas turbine engine 100 includes a fan section 104 and a core engine 106 disposed downstream from fan section 104.

In the exemplary embodiment, core engine 106 includes an approximately tubular outer casing 108 that defines an annular inlet 110. Outer casing 108 encases, in serial flow relationship, a compressor section 112 and a turbine section 114. Compressor section 112 includes, in serial flow relationship, a low pressure (LP) compressor, or booster, 116, a high pressure (HP) compressor 118, and a combustion section 120. Turbine section 114 includes, in serial flow relationship, an HP turbine 122, an LP turbine 124, and a jet exhaust nozzle section 126. An HP shaft, or spool, 128 drivingly connects HP turbine 122 to HP compressor 118. An LP shaft, or spool, 130 drivingly connects LP turbine 124 to LP compressor 116. Compressor section, combustion section 120, turbine section, and nozzle section 126 together define a core air flowpath 132.

In the exemplary embodiment, fan section 104 includes a fan, or variable pitch fan, 134 having a plurality of fan blades 136 coupled to a disk 138 in a spaced apart relationship. Fan blades 136 extend radially outwardly from disk 138. Each fan blade 136 is rotatable relative to disk 138 about a pitch axis P by virtue of fan blades 136 being operatively coupled to a suitable pitch change mechanism (PCM) 140 configured to vary the pitch of fan blades 136. In other embodiments, PCM 140 is configured to collectively vary the pitch of fan blades 136 in unison. Fan blades 136, disk 138, and PCM 140 are together rotatable about longitudinal axis 102 by LP shaft 130 across a power gear box 142. Power gear box 142 includes a plurality of gears (not shown) for adjusting the rotational speed of variable pitch fan 134 relative to LP shaft 130 to a more efficient rotational fan speed.

Disk 138 is covered by a rotatable front hub 144 that is aerodynamically contoured to promote airflow through fan blades 136. Additionally, fan section 104 includes an annular fan casing, or outer nacelle, 146 that circumferentially surrounds variable pitch fan 134 and/or at least a portion of core engine 106. In the exemplary embodiment, annular fan casing 146 is configured to be supported relative to core engine 106 by a plurality of circumferentially-spaced outlet guide vanes 148. Additionally, a downstream section 150 of annular fan casing 146 may extend over an outer portion of core engine 106 so as to define a bypass airflow passage 152 therebetween.

During operation of gas turbine engine 100, a volume of air 154 enters gas turbine engine 100 through an associated inlet 156 of annular fan casing 146 and/or fan section 104. As volume of air 154 passes across fan blades 136, a first portion 158 of volume of air 154 is directed or routed into bypass airflow passage 152 and a second portion 160 of volume of air 154 is directed or routed into core air flowpath 132, or more specifically into LP compressor 116. A ratio between first portion 158 and second portion 160 is commonly referred to as a bypass ratio. The pressure of second portion 160 is then increased as it is routed through HP compressor 118 and into combustion section 120, where it is mixed with fuel and burned to provide combustion gases 162.

Combustion gases 162 are routed through HP turbine 122 where a portion of thermal and/or kinetic energy from combustion gases 162 is extracted via sequential stages of HP turbine stator vanes 164 that are coupled to outer casing 108 and a plurality of HP turbine rotor blades 166 that are coupled to HP shaft 128, thus causing HP shaft 128 to rotate, which then drives a rotation of HP compressor 118. Combustion gases 162 are then routed through LP turbine 124 where a second portion of thermal and kinetic energy is extracted from combustion gases 162 via sequential stages of a plurality of LP turbine stator vanes 168 that are coupled to outer casing 108, and a plurality of LP turbine rotor blades 170 that are coupled to LP shaft 130 and which drive a rotation of LP shaft 130 and LP compressor 116 and/or rotation of variable pitch fan 134.

Combustion gases 162 are subsequently routed through jet exhaust nozzle section 126 of core engine 106 to provide propulsive thrust. Simultaneously, the pressure of first portion 158 is substantially increased as first portion 158 is routed through bypass airflow passage 152 before it is exhausted from a fan nozzle exhaust section 172 of gas turbine engine 100, also providing propulsive thrust. HP turbine 122, LP turbine 124, and jet exhaust nozzle section 126 at least partially define a hot gas path 174 for routing combustion gases 162 through core engine 106.

In an exemplary embodiment, gas turbine engine 100 includes a control system 176. Control system 176 receives (as data inputs 178) measurements from a plurality of operational parameter sensors 180, which are configured to measure operational parameters including, for example, a flow rate from a fuel line 182 supplying fuel to combustion section 120, e.g., from operational parameter sensor 180(A). Control system 176 is additionally or alternatively configured to measure an operational parameter, e.g., from operational parameter sensor 180 (B), a speed of fan section 104 and/or an engine pressure ratio (EPR).

In an exemplary embodiment, control system 176 includes an actuator (not shown), configured from a data output 184, and subsequently modulate a position of a variable stator vane, e.g., stator vane 164 of compressor 118 based on the received data output 184. Control system 176 further includes a processor 186, which is operatively coupled to operational parameter sensors 180(A), 180(B) . . . 180(N), and/or to an actuator (not shown). Control system 176 further includes a storage medium 188, which is also operatively coupled to processor 186. Storage medium 188 includes machine-readable instructions 190, which are executable by processor 176, as well as a lookup table 192, which is accessible by processor 206 (discussed in greater detail below with respect to FIG. 3). In an alternative embodiment, lookup table 192 includes modeling software sometimes referred to as a "virtual sensor."

According to the exemplary embodiment, control system 176 is further configured to control, i.e., through received signals from data outputs 184, flow rate of fuel line 182 to provide a desired rotational speed to fan section 104, and/or a desired EPR. In an example of operation, an optimal value of a data output 204 may be a control signal that controls the position of stator vane 164 which corresponds to a minimum fuel flow rate that substantially maintains the desired output, e.g., desired fan speed and/or desired EPR. In an alternative example of operation, control system 176 monitors data inputs 178 from measurements of operational parameter sensors 200, in order to establish and/or maintain an amount of cooling flow (discussed in greater detail below with respect to FIGS. 2-4) between compressor section 112 and turbine section 114 around combustion section 120. Operational parameter sensors may further be disposed throughout gas turbine engine 100 to detect, without limitation, exhaust gas temperature, core speed, and compressor exit pressure.

Gas turbine engine 100 is depicted in FIG. 1 by way of example only. In other exemplary embodiments, gas turbine engine 100 may have any other suitable configuration including for example, a turboprop engine.

Figure 2:
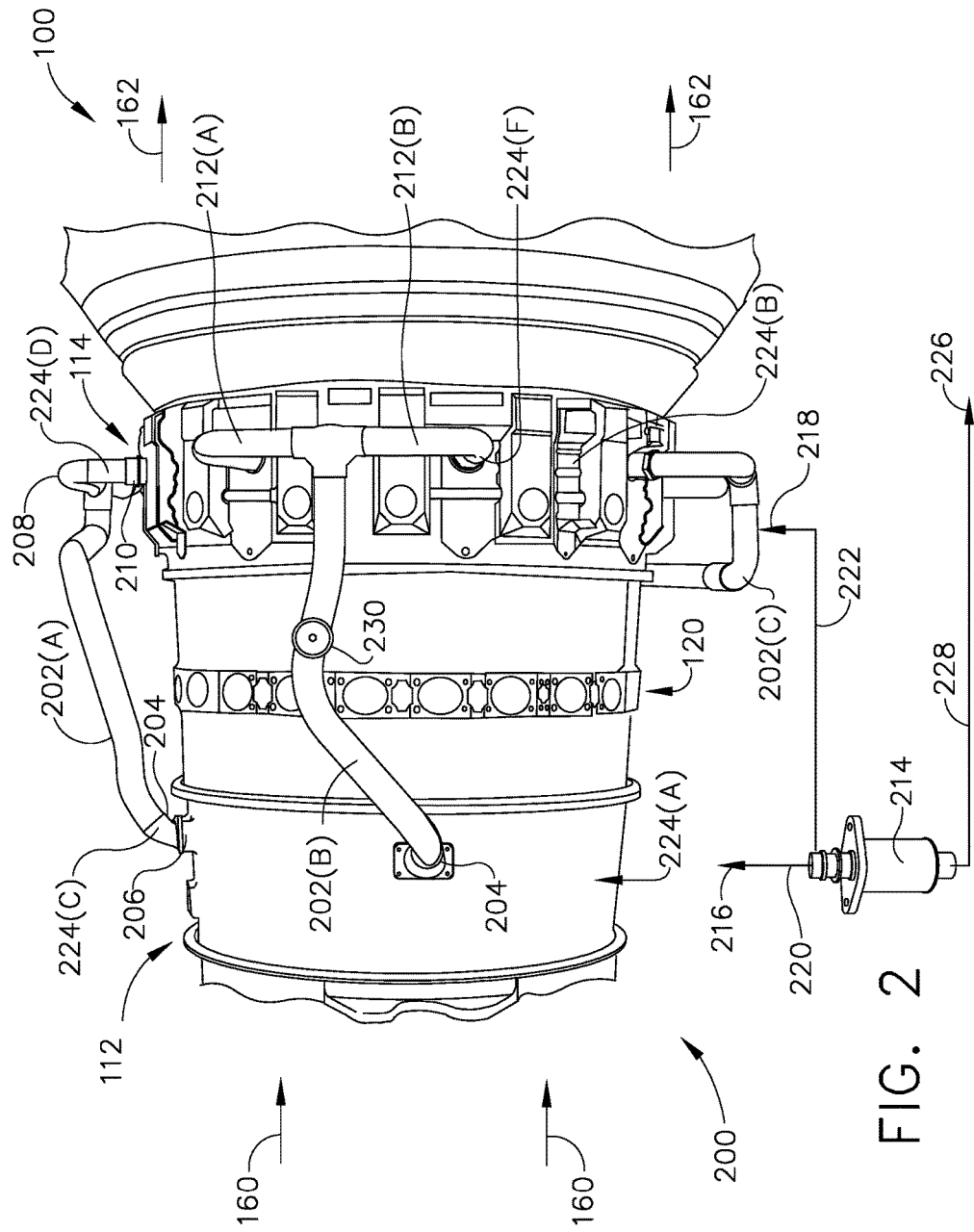
FIG. 2 is a perspective illustration of a piping failure detection system that can be utilized with the gas turbine engine depicted in FIG. 1.

FIG. 2 is a perspective illustration of a piping failure detection system 200 that can be utilized with gas turbine engine 100 depicted in FIG. 1, as well as other gas turbine engines including a compressor section, i.e., compressor section 112, and a turbine section, i.e., turbine section 114. Compressor section 112 is also sometimes referred to as the "cold section," and turbine section 114 is sometimes referred to as the "hot section." With respect to FIG. 1, and other drawings throughout this application, the use of the same reference symbols in different drawings indicates similar or identical exemplary elements for purposes of illustration.

Piping failure detection system 200 includes a cooling manifold 202. In an exemplary embodiment, cooling manifold 202 is at least three or four cooling manifolds 202(A), 202(B) . . . 202(N), to provide even distribution of cooling air, i.e., air portion 160 shown in FIG. 1, from compressor section 112 to turbine section 114, when needed, as well as additional cooling air in the event that the piping of one of the cooling manifolds 202 might break or fail. A first end 204 of cooling manifold 202 externally couples with compressor section 112 at compressor port 206, and a second end 208 of cooling manifold 202 externally couples with turbine section 114 at turbine port 210. In the example illustrated, second end 208 of cooling manifold 202 splits into two portions 212(A) and 212(B).

In the exemplary embodiment, piping failure detection system 200 further includes a pressure sensor 214. Pressure sensor 214 is a differential sensor that measures a pressure change between a first pressure input 216 and a second pressure input 218 that provide air communication with pressure sensor 214 by way of sensing lines 220 and 222, respectively. According to the exemplary embodiment, sensing lines 220, 222 are narrow tubes sized to have a significantly smaller diameter than cooling manifold 202. In the example illustrated, cooling manifold 202 has a diameter between approximately two and four inches, whereas sensing lines 220, 222 each have a diameter of approximately one quarter inch. These exemplary sizes are included for purposes of illustration only, and are not meant to be limiting.

First pressure input 216 and second pressure input 218 are coupled with different openings 224, respectively, between which a change in pressure is desired to be monitored. For example, first pressure input 216 and second pressure input 218 will couple with openings 224(A) and 224(B) to monitor the pressure difference between compressor section 112 and turbine section 114. Alternatively, or additionally with second pressure sensor 214, a pressure change can be monitored along the length of a single cooling manifold 202 between openings 224(C) and 224(D). Pressure change can also be monitored across second end 208 of cooling manifold 202 between portions 212(A), 212(B) at openings 224(E) and 224(F).

According to this exemplary embodiment, multiple pressure sensors 214 can be disposed about the external periphery compressor section 112 and turbine section 114, and along many locations along the piping of cooling manifold 202, or even between two separate cooling manifolds 202. A sensor output 226 transmits the measured pressure difference, if any, between first pressure input 216 and second pressure input 218, as one of the plurality of data inputs 178 into control system 176 by wired or wireless connection 228. In this configuration, pressure sensor 214 may be a simple pressure switch (not separately numbered) that is triggered upon realizing a significant pressure difference between first pressure input 216 and second pressure input 218.

In an alternative embodiment, individual pressure sensors 214 are disposed at each opening 224, and each individual pressure sensor 214 communicates directly with control system 176 by connection 228. In this alternative embodiment, individual pressure sensors 214 may be pressure transducers, and are located at least slightly external from the interior thermodynamically robust environment of compressor section 112 and turbine section 114, to attenuate potential damage to individual pressure transducers from proximity to hot, and/or dynamic combustion gases. For example, when monitoring pressure near turbine section 112, pressure sensor 214 should be disposed upstream of the check valve (not shown). Similarly, sensing lines 220, 222 should generally be as close as possible to the area where a pressure reading is desired, but at least far enough away that the tubing does not get overheated and be rendered incapable of communicating the pressure at the particular individual opening 224.

In operation, under normal conditions, the pressure difference between any two openings along a single cooling manifold 202, or between two different openings between two different cooling manifolds 202, should be nearly zero, i.e., no more than a few pounds per square inch (psi). This pressure difference should hold even for engine conditions such as takeoff, where individual cooling manifolds 202 can experience as much as 300 psi or more of air flowing through the piping. Nevertheless, the pressure difference seen across the entire length of cooling manifold 202 should still be relatively small.

However, once any portion of cooling manifold 202 breaks, the pressure sensors 214 will quickly detect a significant increase in the measured pressure between two nearest openings 224 on either side of the break. Depending on the size of the break, as well as its location, the measured pressure difference can be as much as 10 psi, 50 psi, 100 psi, or greater. By strategic placement of pressure sensors 214, the general location of a pipe break, as well as the magnitude thereof, can be quickly and easily determined without having to tear down the entire gas turbine engine 100 for inspection and repair. A plurality of pressure sensors 214 distributed about the exterior of compressor section 112 and turbine section 114 can serve as backup systems to one another in the event of an individual sensor failure. In that event, control system 176 will only register that a pipe break has occurred if a second pressure sensor 214 confirms the same, or significantly similar, pressure increase.

If a significant pipe break is determined to exist in an individual cooling manifold 202, control system 176 will transmit an individual data output 184 to control the opening of an electronic control valve 230 to increase the amount of cooling air flowing to turbine section 114 in order to make up for the loss of cooling air from the individual cooling manifold 202 experiencing a pipe break. Conventional systems do not have valves to modulate cooling air and maximize cooling flows to the turbine section all the time, sacrificing fuel efficiency in the process. However, according to the exemplary embodiments described herein, fuel efficiency is maximized by providing airflow to cooling manifolds 202 sufficiently as needed by turbine section 114, and increasing cooling flow only when a pipe break is detected. In the exemplary embodiment, electronic control valve 230 is a modulating valve capable of a plurality of positions, fully closed or nearly fully closed, to partly open, to fully open.

In an alternative embodiment, each opening 224 additionally, or alternatively, includes one or more sensors (not separately numbered), other than pressure sensor 214, configured to detect a change in a parameter sensitive to a pipe break. Such additional/alternative sensors include, but are not limited to, temperature sensors or thermocouples, vibration sensors, continuity sensors, a fiber-optic sensor along cooling manifold 202, and/or different types of pressure sensors, such as pop-up sensors or doors sensitive to an increased pressure level in the engine compartment. In this alternative embodiment, the additional/alternative sensors may also communicate with controller 176 by individual wired or wireless connections 228.

During normal operating conditions, when gas turbine engine 100 is cruising at a high altitude, a high-speed, and/or a low ambient temperature, a lower volume of cooling air is required to cool turbine section 114 than would be required during takeoff conditions. At takeoff, gas turbine engine 100 is more likely to run hotter than while cruising. Piping failure detection system 200 is thus capable of continually modulating the volume of cooling air into turbine section 114 as much as is needed, without having to sacrifice fuel efficiency by wasting airflow through a broken pipe/cooling manifold.

Figure 3:
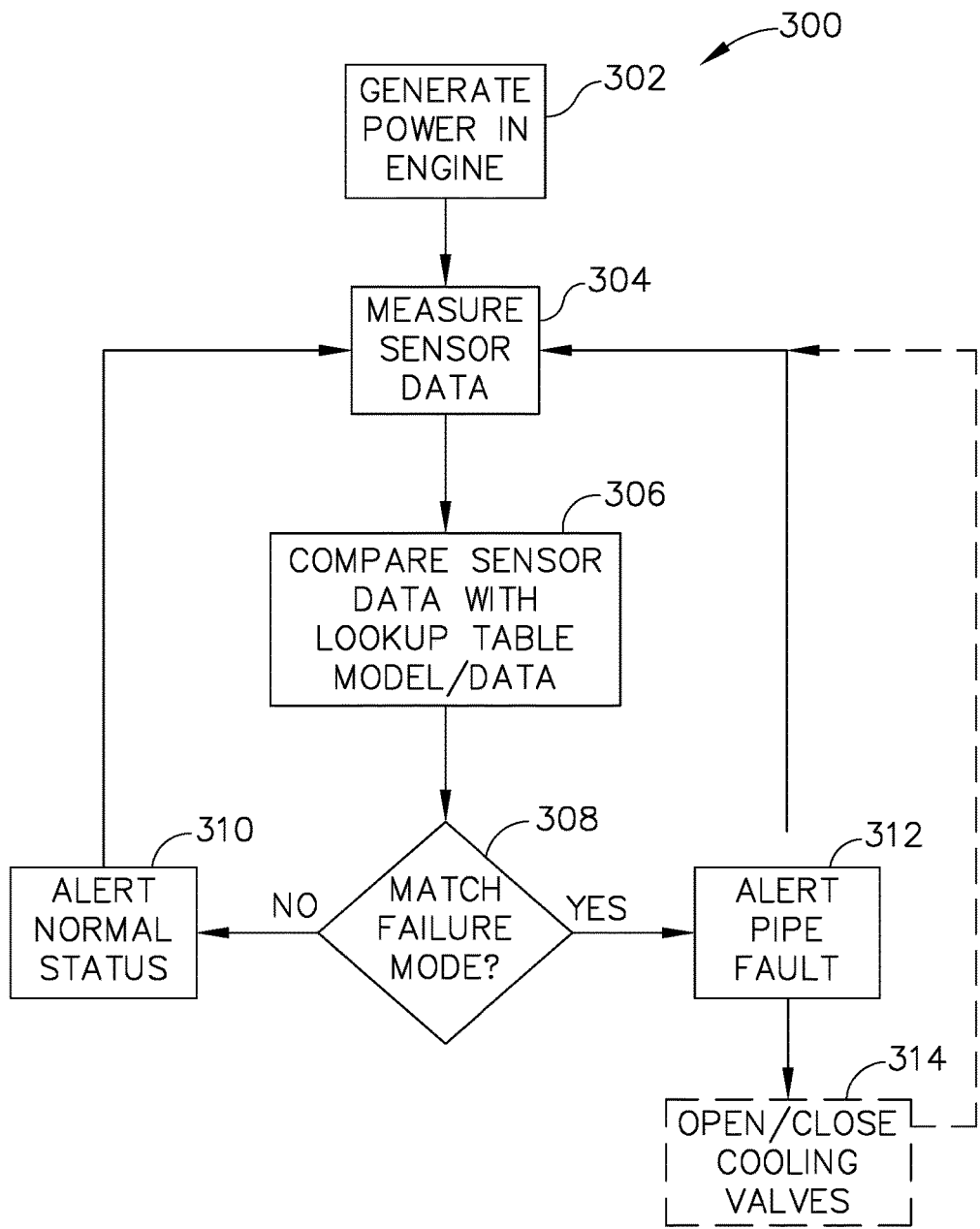
FIG. 3 is a flow chart diagram of a logic process for an alternative embodiment of the piping failure detection system depicted in FIGS. 1 and 2.

FIG. 3 is a flow chart diagram of a logic process 300 for an alternative embodiment of the piping failure detection system depicted in FIGS. 2 and 3. Whereas piping failure detection system 200 adds pressure and/or additional sensors to accumulate the necessary measurement information required to determine that a pipe break has occurred, process 300 is capable of making the same determination without the need for additional hardware, utilizing existing operational parameter sensors 180, seen in FIG. 1, for dual-purpose measurements. In fact, process 300 utilizes the same measurement data operational parameter sensors, described above with respect to FIG. 1, to monitor for broken or failing pipes.

In an exemplary embodiment, table data for differential pressure as a function of pipe break size is created using physics-based models of pipe flow. Alternatively, as discussed above, lookup table 192 is a physics-based model or a regression model that is created or calibrated by generating data from different flight conditions, power levels, and break sizes of gas turbine engine 100 during design and testing phases. The data or modeling software of lookup table 192 can also be calibrated using real engine data gathered from normal operating conditions. In the design and testing phases, gas turbine engine 100 is operated utilizing cooling manifolds 202 having a simulated break using a control valve in some of its piping. The simulated cracked piping can then be varied in size and location during the testing, and each different simulated crack size will manifest as a specific differential pressure, as well as a distinct pattern of changes to other systems of gas turbine engine 100, e.g., fan speed, core speed, exhaust gas temperature, etc. These pattern changes are then converted to readable data forming a lookup table, i.e., lookup table 192, FIG. 1, in storage medium 188 of control system 176. As described below with respect to FIG. 3, processor 186 of control system 176 executes readable instructions, which are also stored in storage medium 188, to compare regular engine operation with this stored pattern data.

Specifically, FIG. 3 illustrates a flow chart diagram of a logic process 300 for piping failure detection. Process 300 begins at step 302. In step 302, gas turbine engine 100 is turned on, and generates power. In the exemplary embodiment described herein, the regular measurements by control system 176 are taken while the engine is fully operational, and do not require shutdown and tear down of the gas turbine engine 100. Once gas turbine engine 100 is fully operational, process 300 proceeds to step 304.

In step 304, control system 176 collects and measures data from individual operational parameter sensors 180, and separately from those control system functions that normally monitor the operational parameter sensors 180, and manipulate the activity of various engine parts based on these measurements. Once these measurements are collected, process 300 proceeds to step 306. In step 306, control system 176 compares the measured sensor data from step 304 with the pattern data stored in lookup table 192, and then proceeds to step 308. Step 308 is a decision step. In step 308, control system 176 determines whether the comparison of real-time measured sensor data with pattern data from lookup table 192 creates a sufficient match. That is, control system 176 determines whether the measured operational parameters of a plurality of sensors and systems in gas turbine engine 100 match a stored data pattern that is strongly indicative of pipe break or failure.

If, in step 308, control system 176 determines that the measured operational parameters do not match a stored failure mode, process 300 then proceeds to step 310, which sends an alert status, e.g., to the cockpit of the plane flying with gas turbine engine 100, of a "normal" operational status to the cooling system between compressor section 112 and turbine section 114. Process 300 then proceeds back to step 304 and repeats while gas turbine engine 100 is generating power.

If, in step 308, control system 176 determines that the measured operational parameters do match a stored failure mode, process 300 then proceeds to step 312, which sends an alert status, e.g., to the cockpit of the plane flying with gas turbine engine 100, of a "pipe fault warning," or the like. In one example of the exemplary embodiment, the alert status will also indicate the location and/or severity of the pipe break or fault. In this example, once the pipe fault warning is provided, process 300 then proceeds back to step 304 and repeats itself while gas turbine engine 100 is generating power. However, process 300 may instead proceed from step 312 to optional step 314 before returning to step 304. In step 314, once the pipe fault is detected, control system 176 sends an output signal 184 to an actuator (not shown) of electronic control valve 230 to open an additional cooling airflow through cooling manifolds 202 to make up for the loss of airflow from cooling manifold 202 containing a broken pipe.

Additionally, the process illustrated in FIG. 3 could also be implemented cooperatively with the embodiment described with respect to FIG. 2. Each of these individual embodiments would operate, in this example, as a check, or a verification, of the broken pipe determinations by the alternative embodiments. The several embodiments described herein may operate independently of one another, or cooperatively together, in whole, or in part.

Exemplary embodiments of piping failure detection systems for gas turbine engines are described above in detail. The detection systems, and methods of operating such systems and component devices are not limited to the specific embodiments described herein, but rather, components of the systems and/or steps of the methods may be utilized independently and separately from other components and/or steps described herein. Rather, the exemplary embodiments can be implemented and utilized in connection with many other machinery applications that implement cooling systems utilizing redirection of cooling airflows.

The above-described integrated sensors and associated sensing systems facilitate extended operation in harsh environments. Specifically, integrating a significant portion of sensing system components in high-temperature and rotatable components during the manufacture of such components reduces the amount of time and resources expended in preparing the high-temperature and rotatable components for insertion into the respective turbomachine after they are manufactured. Further, specifically, the integrated sensors and associated sensing systems described herein include substrate materials and dielectric materials integrated as part of the sensors such that the sensors may be positioned on components, or portions of component, that do not have sufficient substrate and dielectric materials to accept known sensors. Such integration of the sensors with the components includes adding the necessary substrate and/or dielectric materials to the sensors as sensing device features to facilitate placement of the sensors in regions that would otherwise frustrate use of such sensors thereon. Therefore, such integration of the sensors and components facilitates placing the sensors at the most appropriate and desired positions on the components. Further, such integration of the sensors and high-temperature and rotatable components will increase the hurdles to non-OEM (original equipment manufacturer) entities for attempted duplication.

An exemplary technical effect of the methods, systems, and apparatus described herein includes at least one of: (a) integrating sensing system devices in components during the manufacture of such components, thereby reducing the amount of time and resources expended in preparing the components for insertion into the respective turbomachines after they are manufactured; (b) facilitating placement of the sensor components at the most appropriate and desired positions on the high-temperature and rotatable components; (c) positioning sensors in harsh environments that do not have delicate chip features, thereby facilitating more robust sensing devices; (d) providing sensors that are embedded within the associated components during manufacture and are not affixed to their associated components subsequent to manufacturing of those components, thereby facilitating sturdier sensing devices; and (e) facilitating passive operation of a machine sensor in a wireless environment.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pipe fault detection system for a gas turbine engine having a compressor and a turbine, said pipe fault detection system comprising:
    a cooling manifold configured to direct cooling air from the compressor to the turbine, said cooling manifold comprising at least two cooling pipes;
    a sensor configured to detect an operating condition indicative of a pipe break;
    a controller configured to control the amount of cooling air through said cooling manifold in response to the operating condition detected by said sensor; and
    wherein the operating condition is a detected difference between a first operational parameter at a first location and a second operational parameter at a second location different from the first location and wherein said sensor is a first pressure sensor, and wherein said first and second operational parameters are measured pressures at said first location and said second location, respectively and wherein said first pressure sensor is a single pressure switch coupled to both of said first and second locations by respective pressure tubes disposed outside of the compressor and the turbine.

2. The pipe fault detection system as claimed in claim 1, wherein said first pressure sensor is configured to communicate the detected pressure difference between said first and second locations to said controller.

3. The pipe fault detection system as claimed in claim 2, wherein said first location is an opening in said cooling manifold proximate the compressor, and wherein said second location is one of an opening in said cooling manifold proximate the turbine and an opening in said cooling manifold upstream of the turbine.

4. The pipe fault detection system as claimed in claim 2, wherein said first location is an opening in a first one of said at least two cooling pipes upstream of the turbine, and wherein said second location is an opening in a second one of said at least two cooling pipes upstream of the turbine.

5. The pipe fault detection system as claimed in claim 1, further comprising a second pressure sensor comprising a second pressure switch coupled between a third location and a fourth location by respective pressure tubes disposed outside of the compressor and the turbine, wherein said third and fourth locations are different from said first location.

6. The pipe fault detection system as claimed in claim 5, wherein said controller is further configured to control the amount of cooling air through said cooling manifold based on a comparison of said first pressure sensor and said second pressure sensor.

7. A pipe fault detection system for a gas turbine engine having a compressor and a turbine, said pipe fault detection system comprising:
   a cooling manifold configured to direct cooling air from the compressor to the turbine, said cooling manifold comprising at least two cooling pipes;
   a sensor configured to detect an operating condition indicative of a pipe break;
   a controller configured to control the amount of cooling air through said cooling manifold in response to the operating condition detected by said sensor; and
   wherein the operating condition is a detected difference between a first operational parameter at a first location and a second operational parameter at a second location different from the first location and wherein said sensor is a first pressure sensor, and wherein said first and second operational parameters are measured pressures at said first location and said second location, respectively wherein said pressure sensor comprises a first pressure switch disposed proximate said first location and a second pressure switch disposed proximate said second location, and wherein said first and second pressure switches are configured to transmit measured pressure data electronically to said controller by one of direct wiring and wireless transmission.

* * * * *